(12) United States Patent
Wallmeier et al.

(10) Patent No.: US 8,829,867 B2
(45) Date of Patent: Sep. 9, 2014

(54) DEVICE FOR THE DISTRIBUTION OF FIRING PULSES CIRCUIT ARRANGEMENT FOR THE SEQUENCE CONTROL OF POWER REGULATORS

(75) Inventors: Peter Wallmeier, Lippstadt (DE); Wolfgang Paul, Warstein-Belecke (DE)

(73) Assignee: AEG Power Solutions B.V., Zwanenburg (NL)

( * ) Notice: Subject to any disclaimer, the term of this patent is extended or adjusted under 35 U.S.C. 154(b) by 525 days.

(21) Appl. No.: 13/111,035

(22) Filed: May 19, 2011

(65) Prior Publication Data
US 2011/0285371 A1    Nov. 24, 2011

(30) Foreign Application Priority Data

May 21, 2010   (EP) ..................................... 10163528

(51) Int. Cl.
   *G05F 1/00*   (2006.01)
   *H02P 13/06*  (2006.01)
   *H02M 3/00*   (2006.01)

(52) U.S. Cl.
   CPC  *H02M 3/00* (2013.01); *H02P 13/06* (2013.01)
   USPC ....................................................... 323/268

(58) Field of Classification Search
   CPC ............. H02M 3/00; H02P 13/06; G05F 1/40
   USPC .......... 363/44, 57, 85, 96, 128, 135; 323/268, 323/271, 282, 285
   See application file for complete search history.

(56) References Cited

U.S. PATENT DOCUMENTS

| | | | |
|---|---|---|---|
| 6,404,656 B1 * | 6/2002 | Jonsson et al. | 363/57 |
| 6,437,995 B2 * | 8/2002 | Ainsworth et al. | 363/37 |
| 6,541,933 B1 * | 4/2003 | Leggate et al. | 318/599 |
| 6,856,122 B2 | 2/2005 | Dohnal et al. | |
| 2013/0241463 A1 * | 9/2013 | Bando et al. | 318/810 |

FOREIGN PATENT DOCUMENTS

| | | |
|---|---|---|
| DE | 10102310 C1 | 6/2002 |
| EP | 0235578 A2 | 9/1987 |
| EP | 1318702 A1 | 6/2003 |
| EP | 2146554 A1 | 1/2010 |

OTHER PUBLICATIONS

European Search Report dated Dec. 17, 2010.
E. Chiesa, P. Toso: "SCR's Control Tagged Autotransformer", Control Engineering, Jan. 1964, pp. 84-86, XP001406675.

(Continued)

*Primary Examiner* — Matthew Nguyen
(74) *Attorney, Agent, or Firm* — Cohen & Hildebrand, PLLC

(57) ABSTRACT

This invention relates to a device (13) for the distribution of firing pulses, a circuit arrangement (10) for sequence control of power regulators (20) with this device (13) for the distribution of firing pulses and a process for the sequence control of power regulators (20) for operation with this circuit arrangement (10). A circuit arrangement of the above type and components for such a circuit arrangement and a process for operation of the circuit arrangement is provided, enabling better usage of the components, in particular of the device (12) for the generation of firing pulses. This is made possible through the invented device (13) for the distribution of firing pulses or an invented circuit arrangement (10) with this device (13).

12 Claims, 1 Drawing Sheet

(56) References Cited

OTHER PUBLICATIONS

Karady G G, et al. "Integrated PWM and transformer switching technique for AC voltage regulation", Applied Power Electronic Conference and Exposition, 1994. XP010118467.

"A. C. Regulators" In: Gopal Krishna Dubey, et al., "Thyristored Power Controllers", 1986, Wiley Eastern Limited, Kanpur, India, XP002612270.

* cited by examiner

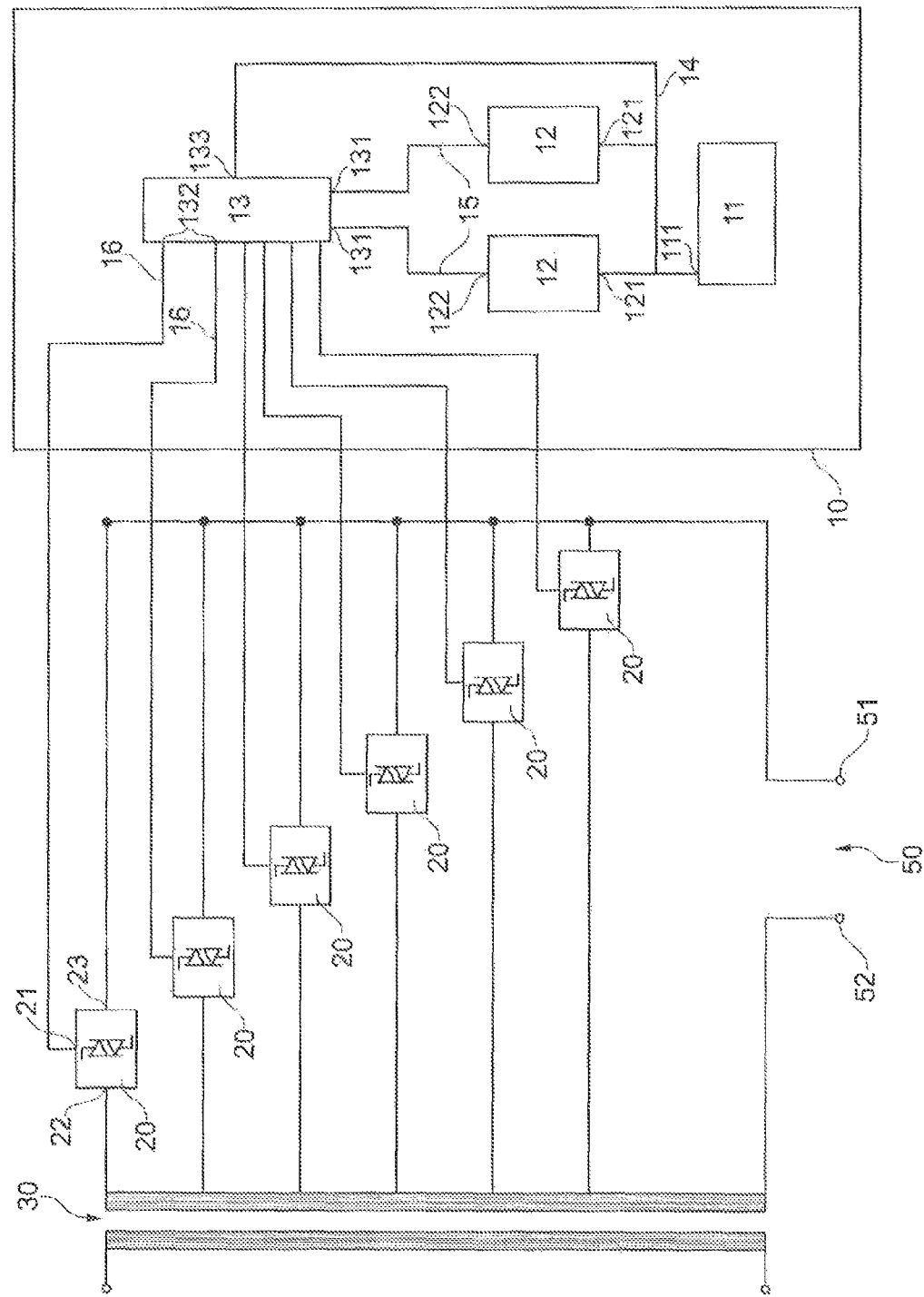

DEVICE FOR THE DISTRIBUTION OF FIRING PULSES CIRCUIT ARRANGEMENT FOR THE SEQUENCE CONTROL OF POWER REGULATORS

BACKGROUND OF THE INVENTION (1) Field of the Invention

This invention relates to a device for the distribution of firing pulses, a circuit arrangement for sequence control of power regulators with such a device for distribution of firing pulses and a process for the sequence control of power regulators for operation with such a circuit arrangement.

(2) Description of Related Art

In various utility model documents and publications of patent applications by AEG Power Solutions B.V., AEG Power Solutions GmbH, AEG Power Supply Systems GmbH, power supply assemblies with power regulators are known that are operated with a sequence control—also as a voltage sequence control. Moreover the book "Thyristorized Power Controllers" by G. K. Dubey, S. R. Doradla, A. Joshi and R. M. K. Sinha, ISBN 978-0-85226-190-3 describes such power supply assemblies.

In the case of a power supply assembly with power regulators operated with sequence control, there is generally a transformer that has several secondary taps. Each of these taps is linked with a power regulator input. The outputs from the power regulator are merged in a bus bar. The bus bar is linked with an output of the power supply assembly. A voltage is created between the output of the power supply assembly and a reference potential. whose effective value is set by at least one power regulator, frequently however by two power regulators.

Using phase control, the effective value of the voltage can be adjusted at the output of each power regulator. Because of the connection between the power regulator inputs with various secondary transformer taps, the effective values of the maximum voltages at the power regulator output differ. Theoretically it is possible to set voltages in the entire voltage range between 0 V and the maximum voltage with the power regulator whose inlet is connected to the transformer tap, in which the maximum voltage is provided. In practice however this runs into difficulties. Moreover, high voltage jumps are obtained, leading to excessive harmonics, reducing the power factor of the power supply assembly. For this reason, with sequence control for setting a voltage between the voltage levels of two transformer taps, one power regulator is switched through during the complete half-wave of the network voltage, while the other power regulator, according to a control angle is operated with phase angle control. Thus, two power regulators are very often operated with this type of power supply.

With the previously-known power supply assemblies, every power regulator is allocated a device for the generation of a firing pulse. Each device for the generation of the firing pulse is connected with a control and/or regulator. The power regulators that have to be operated in order to set this voltage are determined in the controller and/or regulator according to the voltage desired. The control angle that has to be set by the power regulator, which is connected on the input side with the higher voltage potential, is also determined here As only two power regulators are generally operated in the case of a power supply assembly with power regulators operated in sequence control, a number of components, in particular a number of the devices for the generation of firing pulses, are unused during the operation of such a power supply assembly.

The connection between the controller and/or regulator and the device for the generation of the firing pulses is via a bus. A frequently-used bus has a bandwidth of 16 bits, i.e. data words with a width of 16 bits, can be transmitted. With a data word sent via the bus it is also possible to show—or as often termed—address 216 different statuses. This was used in the past such that each power regulator of the power supply assembly was allocated a section in the addressable space. Each status in a section of the addressable space was also allocated a control angle. If a data word was given by the controller and/or regulator to the bus, the control angle to be set for all power regulators was given to the bus simultaneously. The section of the data word containing the information for the control angle of the downstream power regulator was evaluated in every device for the generation of firing pulses.

This manner of transmitting the control angle information meant that, for example, a total of 65536 statuses could be shown with a word width of 16 bits. In a power supply assembly with four power regulators, each power regulator is allocated a section of 4 bits. It is possible to allocate each power regulator 24=16 statuses. If the adjustable control angle lies between 0 and 180°, a resolution of 181°:16=11, 313° is possible. The resolution is better for larger and more realistic word widths. The example shows, however, how the resolution can be determined. The resolution worsens when the power supply assembly has more power regulators. A large number of power regulators may be necessary, however, if large voltage swings are to be set. A large number of power regulators can also be advantageous if the output factor is to be increased. The voltage swings then realized by each individual power regulator can be reduced by a large number of power regulators. The proportion of the harmonics can be reduced, as the voltage range covered by the individual power regulators becomes smaller.

This is the basis for this invention.

BRIEF SUMMARY OF THE INVENTION

The invention is based on the problem of proposing a circuit arrangement of the above type and components for such a circuit arrangement and a process for the operation of the circuit arrangement enabling better usage of the components, in particular of the device for the generation of firing pulses and a higher resolution.

The problem underlying the invention is initially approached by means of new components for a circuit arrangement. The invention suggests a means for the distribution of firing pulses. The device for the distribution of firing pulses has the function of distributing the firing pulses generated from at least one device for the generation of firing pulses to the power regulators of the power supply assembly. To this end, the invented device for the distribution of firing pulses is fitted with at least two inputs for connecting to at least one device for the generation of firing pulses, with an interface for connecting to a controller and/or regulator, and with at least three outputs for connecting to power regulators, whereby the device means for the distribution of firing pulses has adjustable elements for connecting each of the at least two inputs with one of the three outputs depending on at least one piece of selection information available at the interface.

The invented device for the distribution of firing pulses is used in an invented circuit arrangement for sequence control of power regulators, whereby a circuit arrangement, as shown in this invention, is fitted with a controller and/or regulator, whereby the control and/or regulating means has at least one interface, on which the selection information and control angle information can be provided, whereby a control angle provides information as to which control angle of one of the power regulators is to be used for operation, and a piece of selection information shows which of the power regulators is to be operated with the said control angle, and is fitted with at least one device for the generation of firing pulses, whereby the device for the generation of firing pulses has an interface, via which at least one piece of the control angle information can be entered in the device for the generation of firing pulses, and has at least one output at which according to at least one piece of control angle information a firing pulse can be provided.

With some circuit arrangements in this invention, not every power regulator that can be controlled via the circuit arrangement can be allocated a device for the generation of firing pulses. The number of devices for the generation of firing pulses is, rather, smaller than the number of power regulators that can be connected to the circuit arrangement. The firing pulses generated by the few devices for the generation of firing pulses are distributed to the power regulators by the invented device for the distribution of the firing pulses. Which of the power regulators is to be supplied with the firing pulses generated by the device for the generation of firing pulses derives from the selection information at the interface of the device for the distribution of firing pulses, generated by the control and/or regulating means.

The invented circuit arrangement can be operated according to the invention so that the selection information and the control angle information, provided on one hand to the device for the distribution of firing pulses and on the other to at least one device for the generation of firing pulses, is coded in a data word. One part of the data word is needed for the coding of the selection information, which only has a very small width. If an invented circuit arrangement for connection with four power regulators is intended, the section in which the selection information is coded has a width of 2 bits. Of the 16 bits of the data word, only 14 bits then remain for control angle information. Since under normal circumstances only two power regulators are operated simultaneously, only two pieces of control angle information are transmitted. 7 bits then remain for the transmission of each of the two pieces of control angle information. 128 statuses can be shown using these 7 bits. This results in a resolution of 181°:128=1.414. With an equal word length of the data word to be transmitted and an equal number of power regulators, it is possible to achieve significantly greater resolution and thus a significantly more precise setting of the power regulators.

The controllable elements of an invented device for the distribution of firing pulses may have controllable switches, in particular transistors, for the connection. An invented device for the distribution of firing pulses may have a circuit, which is connected to the interface and control connections of the connecting elements. The circuit, which may be an integrated circuit, may be used for converting the selection information into signals for controlling the controlled switch elements.

A maximum of two power regulators can be selectable with the controller and/or regulator of an invented circuit arrangement, the selection of which can be realized as selection information available at the interface. A maximum of two control angles can also be set with the controller and/or regulator, which are provided as control angle information at the interface. The device for the generation of firing pulses can have at least two outputs, at which a firing pulse each is provided corresponding to the two sets of control angle information. Alternatively, two devices for the generation of firing pulses can each be given one output.

The controller and/or regulator interfaces, the device for the generation of firing pulses interface and the device for the distribution of firing pulses interface of an invented circuit arrangement can be connected with each other via a bus. The bus can be a bus complying with IEC 61158 or IEC 61784 (PROFIBUS).

Further characteristics and advantages of a circuit arrangement as in this invention become clear from the description of a design example of the invention. The design example is presented in the drawing. This is shown in

BRIEF DESCRIPTION OF THE DRAWING

FIG. 1 shows a simplified circuit diagram of a power supply assembly with circuit arrangement, as in the invention.

DETAILED DESCRIPTION OF THE INVENTION

The invented power supply assembly shown in FIG. 1 comprises, alongside the invented circuit arrangement 10, a series of power regulators 20, addressed by the circuit arrangement 10. The power regulators 20 have inputs 22 to be connected with secondary taps of a transformer 30. The primary side of the transformer 30 is connected to an AC network. The power regulators 20 also have outputs 23 combined in a bus bar 40. The bus bar 40 is connected with a connection 51 of an output 50 of the power supply assembly. A second connection 52 of the output 50 of the power supply assembly is connected with a secondary tap of the transformer 30, which lies on the reference potential of the power supply assembly. The power regulators 20 may be operated in a known manner using sequence control. The invented circuit arrangement 10 is intended for operation of the power regulators 20 in sequence control. Each of the power regulators has a control connection 21 connected to this end with the invented circuit arrangement 10. Via the control connections 21 firing pulses are transmitted to the power regulators 20.

The firing pulses are generated in the Invented circuit arrangement 10. The times when firing pulses are generated and the power regulators 20, to which the firing pulses are transmitted, are specified by a controller and/or regulator 11 in the invented circuit arrangement 10. The times, when the firing pulses are transmitted, are determined by the control angle specified in the controller and/or regulator 11. Since, with sequence control, a maximum of two power regulators 20 are generally operating, it is only necessary to simultaneously determine two control angles. The two control angles are coded in control angle information. The power regulators 20, to which the firing pulses are given, are selected by the controller and/or regulator 11 and coded in selection information. The selection information and the control angle information are collated into a data word. The first section of the data word contains the selection information and the second section of the data word contains the control angle information. The controller and/or regulator 11 is connected via an interface 111 with a bus 14.

The data word is sent via the bus 14.

Alongside the connection to the interface 111 of the controller and/or regulator 11, the bus 14 has connections to interfaces 121 to two devices 12 for the generation of firing pulses and to one interface 133 from device 13 for the distribution of firing pulses.

In the device 12 for the generation of firing pulses, the two pieces of control angle information containing data words sent via the bus 14 are decoded and converted into firing pulses used to fire the power regulators 20 as selected by the controller and/or regulator 11. The firing pulses are provided at outputs 122 of the device 12 for the generation of firing pulses and sent via cables 15 at inputs 131 to the devices 13 for the distribution of firing pulses.

The device 13 for the distribution of firing pulses, alongside the inputs 131, has outputs 132 connected to the control cables 16 and to the control connections 21 of the power regulators 20.

By connecting the inputs 131 with one of the outputs 132, the firing pulse at input 131 can be routed to output 132 and then via the control cable 16 connected with this output 132 to the power regulators 20 connected to this control cable 16.

The device 13 for the distribution of firing pulses has controllable elements (not shown) for the distribution of the firing pulses. These can be provided by controllable switching devices, e.g. transistors. How the controlled elements for the distribution of the firing pulses distributes the firing pulses to the outputs 132 derives from the selection information, which the device 13 for the distribution of firing pulses can obtain via interface 133, which is connected to the bus 14. from the data word sent to the bus 14. To this end, the device 13 for the distribution of firing pulses decodes the selection information coded in the data word and connects the inputs 131 with the outputs 132 corresponding to the selection information. The controlled switching elements provided are addressed accordingly for closing or opening, whereby connections are created or interrupted between the inputs 131 and the outputs 132. Each of the inputs 131 can be connected with each of the outputs 132 via a controllable switching element.

The invention claimed is:

1. A device (13) for selectively distributing firing pulses to at least one from among a plurality of power regulators (20), the device (13) comprising:
    at least two inputs (131), the device (13) for distributing firing pulses being connected to at least one device (12) that generates firing pulses via the at least two inputs (131),
    an interface (133) configured for connection with a controller and/or regulator (11), and
    at least three outputs (132) configured for connection with power regulators (20), wherein the device (13) for distributing firing pulses comprises controllable elements for connecting each of the at least two inputs (131) with one of the at least three outputs (132) depending on at least one selection information applied at the interface (133).

2. The device (13) according to claim 1, wherein the controllable elements for the connection are controllable switches.

3. The device (13) according to claim 1, wherein the device (13) for the distribution of firing pulses has a circuit connected to the interface (133) and control connections of the connecting elements.

4. A circuit arrangement (10) for sequence control of power regulators (20), comprising
    a controller and/or regulator (11), the controller and/or regulator (11) has at least one interface (111), at which selection information and control angle information is provided as a data word,
    the control angle information shows the control angle, with which one of the power regulators (20) is to be operated and the selection information regarding which of the power regulators (20) is to be operated with the said control angle, and
    with at least one device (12) for the generation of firing pulses, whereby the device (12) for the generation of firing pulses has an interface (121), via which at least one of the pieces of control angle information from the data word is enterable in the device (12) for the generation of firing pulses, and has at least one output (122), at which a firing pulse is provided according to at least one piece of control angle information,
    wherein the circuit arrangement (10) has a device (13) for distributing firing pulses, the device (13) for distributing firing pulses has an interface (133),
    wherein the interface (121) of the at least one device (12) for the generation of firing pulses and the interface (133) of the device (13) for the distribution of firing pulses each receive as input the data word.

5. The circuit arrangement (10) according to claim 4, wherein a maximum two power regulators (20) is selectable with the controller and/or regulator (11), whose selection is provided as selection information at the interface (111).

6. The circuit arrangement (10) according to claim 5, wherein a maximum two control angles are settable with the controller and/or regulator (11) provided as pieces of control angle information at the interface (111).

7. The circuit arrangement (10) according to claim 6, wherein the device (12) for the generation of firing pulses has two outputs (122), at which one firing pulse each is provided according to the two pieces of control angle information.

8. The circuit arrangement (10) according to claim 4, wherein the respective interfaces (11, 121, 133) of the controller and/or regulator (11), of the at least one device (12) for the generation of firing pulses and the device (13) for the distribution of firing pulses are interconnected via a bus (14).

9. A process for the sequence control of power regulators (20), comprising the steps of:
    providing a controller and/or regulator (11) having at least one interface (111) for providing selection information and control angle information suitable,
    providing a control angle information for operating the power regulators (20), and
    providing at least one device (12) having an interface (121) for entering control angle information for the generation of firing pulses, and at least one output (122), at which a firing pulse is provided according to at least one piece of control angle information,
    wherein the circuit arrangement (10) has a device (13) for distributing firing wherein the process is realized with a circuit arrangement (10) according to claim 4.

10. The process according to claim 9, wherein the selection information and the control angle information is transmitted by the controller and/or regulator (11) in the data word via the interface (111) to a bus (14), whereby the data word has a first section for the selection information and a second section for the control angle information.

11. The device (13) according to claim 2, wherein the controllable switches are transistors.

12. The circuit arrangement (10) according to claim 4, wherein a number of the at least one device that generates firing pulses (12) is less than a number of the plural power regulators (20) connectable to the circuit arrangement (10).

* * * * *